US007067456B2

(12) United States Patent
Fan et al.

(10) Patent No.: US 7,067,456 B2
(45) Date of Patent: Jun. 27, 2006

(54) SORBENT FOR SEPARATION OF CARBON DIOXIDE ($CO_2$) FROM GAS MIXTURES

(75) Inventors: Liang-Shih Fan, Columbus, OH (US); Himanshu Gupta, Columbus, OH (US)

(73) Assignee: The Ohio State University, Columbus, OH (US)

( * ) Notice: Subject to any disclaimer, the term of this patent is extended or adjusted under 35 U.S.C. 154(b) by 114 days.

(21) Appl. No.: 10/359,763

(22) Filed: Feb. 6, 2003

(65) Prior Publication Data

US 2006/0039853 A1    Feb. 23, 2006

(51) Int. Cl.
  *B01J 20/00* (2006.01)

(52) U.S. Cl. .................. 502/400; 502/340; 502/439
(58) Field of Classification Search ............... 502/400, 502/417, 340, 439
  See application file for complete search history.

(56) References Cited

U.S. PATENT DOCUMENTS

| | | | |
|---|---|---|---|
| 4,226,839 A | * | 10/1980 | O'Neill et al. ............... 423/177 |
| 4,533,532 A | | 8/1985 | Gebhard et al. ............ 423/244 |
| 4,729,889 A | | 3/1988 | Flytani-Stephanopoulos et al. ........................ 423/593 |
| 4,950,409 A | | 8/1990 | Stanforth ................... 210/751 |
| 5,084,256 A | * | 1/1992 | McElroy et al. ........ 423/243.08 |
| 5,087,597 A | * | 2/1992 | Leal et al. .................... 502/62 |
| 5,160,715 A | | 11/1992 | Pinnavaia et al. ..... 423/244.08 |
| 5,275,739 A | | 1/1994 | Grant et al. ................ 210/682 |
| 5,779,464 A | | 7/1998 | Fan et al. .............. 423/244.08 |

OTHER PUBLICATIONS

Herzog et al., CO2 Capture, Reuse, and Storage Technologies for Mitigating Global Climate Change, A White Paper Final Report, Energy Laboratory, Jan., 1997, pp. 1-66.
Barker, The Reactivity of Calcium Oxide Towards Carbon Dioxide and its Use for Energy Storage, J. Appl. Chem. Biotechnol. 1974, 24, 221-227.
Dedman et al., Calcium Cyanamide Synthesis, Explosives Research and Development Establishment, Ministry of Aviation, Mar., 1962, pp. 2027-2035.
Mess et al., Product Layer Diffusion During the Reaction of Calcium Oxide With Carbon Dioxide, Energy & Fuels 1999, 13, 999-1005.
Wei, et al., High Surface Area Calcium Carbonate: Pore Structurual Properties and Sulfation Characteristics, Ind. Eng. Chem. Res., 1997, 36, 2141-2148.
Agnihotri et al., Influence of Surface Modifiers on the Structure of Precipitated Calcium Carbonate, Ind. Eng. Chem. Res. 1999, 38, 2283-2291.
Bhatia et al., Effect of the Product Layer on the Kinetics of the CO2-Lime Reaction,AIChE Journal, vol. 29, No. 1, Jan. 1983, 79-86.
Barker, The Reversibility of the Reaction CaCO3 ←→ CaCO+CO2, J. Appl. Chem. Biotechnol. 1973, 23, 733-742.
Kato et al., Kinetic Feasibility of a Chemical Heat Pump for Heat Utilization of High-Temperature Processes, Applied Thermal Engineering 19, 1999, 239-254.
Butt et al., Kinetics of Thermal Dehydroxylation and Carbonation of Magnesium Hydroxide, J. Am. Ceram. Soc., vol. 79, No. 7, 1996, 1892-1898.
Kato et al., Utilization of High Temperature Heat From Nuclear Reactor Using Inorganic Chemical Heat Pump, Progress in Nuclear Energy, vol. 32, No. 3 / 4, 1998, 563-570.
Fernandez et al., Kinetic Study of Carbonation of MgO Slurries, Hydrometallurgy 53, 1999, 155-167.
Shaheen et al., Effects of Thermal Treatment on Physiocochemical Properties of Pure and Mixed Manganese Carbonate and Basic Copper Carbonate, Thermochimica Acta 322, 1998, 117-128.
Mimura et al., Development of Energy Saving Technology for Flue Gas Carbon Dioxide Recovery in Power Plant by Chemical Absorption Method and Steam System, Energy Convers. Mgmt., vol. 38, Suppl., 1997, S57-S62.
Sawada et al., Thermal Analysis of Basic Zinc Carbonate, Part 1. Carbonation Process of Zinc Oxide Powders at 8 and 13° C., Thermochimica Acta 273, 1996, 95-102.
Kikkinides et al., Concentration and Recovery of CO2 From Flue Gas by Pressure Swing Adsorption, Ind. Eng. Chem. Res. 1993, 32, 2714-2720.

(Continued)

*Primary Examiner*—Edward M. Johnson
(74) *Attorney, Agent, or Firm*—Standley Law Group LLP

(57) ABSTRACT

A reaction-based process has been developed for the selective removal of carbon dioxide ($CO_2$) from a multicomponent gas mixture to provide a gaseous stream depleted in $CO_2$ compared to the inlet $CO_2$ concentration in the stream. The proposed process effects the separation of $CO_2$ from a mixture of gases (such as flue gas/fuel gas) by its reaction with metal oxides (such as calcium oxide). The Calcium based Reaction Separation for $CO_2$ (CaRS-$CO_2$) process consists of contacting a $CO_2$ laden gas with calcium oxide (CaO) in a reactor such that CaO captures the $CO_2$ by the formation of calcium carbonate ($CaCO_3$). Once "spent", $CaCO_3$ is regenerated by its calcination leading to the formation of fresh CaO sorbent and the evolution of a concentrated stream of $CO_2$. The "regenerated" CaO is then recycled for the further capture of more $CO_2$. This carbonation-calcination cycle forms the basis of the CaRS-$CO_2$ process. This process also identifies the application of a mesoporous $CaCO_3$ structure, developed by a process detailed elsewhere, that attains >90% conversion over multiple carbonation and calcination cycles. Lastly, thermal regeneration (calcination) under vacuum provided a better sorbent structure that maintained reproducible reactivity levels over multiple cycles.

3 Claims, 13 Drawing Sheets

OTHER PUBLICATIONS

Blauwhoff et al., A Study on the Reaction Between CO2 and Alkanolamines in Aqueous Solutions, Chemical Engineering Science, vol. 39, No. 2, 1984, 207-225.

Pauley et al., N-ReN Recovers CO2 From Flue Gas Economically, Technology Oil and Gas Journal, 1984, 87-92.

Kaplan, Cost-Saving Process Recovers CO2 From Power-Plant Fluegas, Chemical Engineering, 1982, 30-31.

Tinkler et al., Towards a Coal-Capable Solid Oxide Fuel Cell System, *Proceedings of the 26th International Technical Conference on Coal Utilization and Fuel Systems*; Clearwater, Florida, Mar. 5-8, 2001; pp. 569-570.

Gupta et al., Carbonation-Calcination Cycle Using High Reactivity Calcium Oxide for Carbon Dioxide Separation From Flue Gas, Ind. Eng. Chem. Res. 2002, 41, 4035-4042.

Keeling, C.D., Atmospheric CO2 concentrations (ppmv) derived from in situ air samples collected at Mauna Loa Observatory, Hawaii, http://cdiac.esd.ornl.gov/ftp/maunaloa-co2/maunaloa.co2, Jul. 25, 2003, 2 pp.

Milne et al., High-Temperature, Short-Time Sulfation of Calcium-Based Sorbents, *Ind. Eng. Chem. Res.*, vol. 29, No. 11, pp. 2201-2214 (1990).

Borgwardt, Sintering of Nascent Calcium Oxide, *Chemical Engineering Science*, vol. 44, No. 1, pp. 53, 60 (1989).

Bortz and Flament, Recent IFRF Fundamental and Pilot Scale Studies on the Direct Sorbent Injection Process, *International Flame Research Foundation*, pp. 17-1-17-22 (1985).

Kirchgessner, D. A., & Jozewicz, W., Enhancement of Reactivity in Surfactant-Modified Sorbents for Sulfurdioxide Control, *Ind. Eng. Chem. Res.*, 28(4), pp. 413-418 (1989).

Raghunathan et al. Raghunathan K., A. Ghosh-Dastidar, and L.-S. Fan, A Technique for the Study of Ultrafast Gas-Solid Reactions for Residence Times less than 100 ms, *Rev. Sci. Instrum.*, 63(11), 5469 (1992).

Ghosh-Dastidar, et al. Ghosh-Dastidar, A., Mahuli, S., Agnihotri, R., and Fan, L.-S., Ultrafast Calcination and Sintering of Ca(OH)2 powder: Experimental & Modeling, *Chem. Eng. Sci.*, vol. 50, No. 13, pp. 2029-2040, (1995).

Kirchgessner, Lorrain, Lignosulfonate-Modified Calcium Hydroxide for Sulfur Dioxide Control,*m Ind. Eng. Chem. Res.*, 1987, 26, pp. 2397-2400.

B.K. Gullett, K.R. Bruce, Pore Distribution Changes of Calcium-Based Sorbents Reacting with Sulfur Dioxide, *AIChE Journal*, Oct. 1987, vol. 33, No. 10, pp. 1719-1726.

K.R. Bruce, B.K. Gullet, L.O. Beach, Comparative SO2 Reactivity of CaO Drived from CaCO3 and Ca(OH)2. *AIChE Journal*, Jan. 1989, vol. 35, No. 1, pp. 37-41.

Ghosh-Dastidar, S. Mahuli, R. Agnitiotri and L.-S. Fan, Selenium Capture Using Sorbent Powders: Mechanisms of Sorption by Hydrated Lime. Sep. 11, 1995.

S.W. Wei et al. High Surface Area Calcium Carbonate: Pore Structural Properties and Sulfation Characteristics, Ind. Eng. Chem. Res., 1997, vol. 36, No. 6, pp. 2141-2148.

Suhas K. Mahuli, et al., Pore-Structure Optimization of Calcium Carbonate for Enhanced Sulfation, 1997, 13 pp.

Gupta, H., NOx Reduction by Carbonaceous Materials and CO2 Separation Using Regenerative Metal Oxides From Fossil Fuel Based Flue Gas, Dissertation, The Ohio State University, cataloged Oct. 1, 2001, 75 pages.

* cited by examiner

US 7,067,456 B2

SORBENT FOR SEPARATION OF CARBON DIOXIDE ($CO_2$) FROM GAS MIXTURES

TECHNICAL FIELD OF THE INVENTION

The present invention relates to the application of chemical sorbents for the separation of $CO_2$ from gas mixtures.

BACKGROUND OF THE INVENTION

As used herein, the term "supersorbent" shall mean a sorbent as taught in U.S. Pat. No. 5,779,464 entitled "Calcium Carbonate Sorbent and Methods of Making and Using Same", the teachings of which are hereby incorporated by reference.

As used herein, the term "microporous" shall mean a pore size distribution of less than 5 nanometers. As used herein, the term "mesoporous" shall mean a pore size distribution of from about 5 nanometers to about 20 nanometers.

Atmospheric $CO_2$ concentration has been increasing steadily since the industrial revolution. It has been widely accepted that the while the $CO_2$ concentration was about 280 ppm before the industrial revolution, it has increased from 315 ppmv in 1959 to 370 ppmv in 2001 [Keeling, C. D. and T. P. Whorf. 2002. Atmospheric $CO_2$ records from sites in the SIO air sampling network. In Trends: A Compendium of Data on Global Change. Carbon Dioxide Information Analysis Center, Oak Ridge National Laboratory, U.S. Department of Energy, Oak Ridge, Tenn., U.S.A. This data is also available from http://cdiac.esd.ornl.gov/ftp/maunaloa-co2/maunaloa.co2]. Rising $CO_2$ concentrations has been reported to account for half of the greenhouse effect that causes global warming [IPCC Working Group I. IPCC Climate Change 1995—The Science of Climate Change: The Second Assessment Report of the Intergovernmental Panel on Climate Change; Houghton, J. T., Meira Filho, L. G., Callander, B. A., Harris, N., Kattenberg, A., Maskell K, Eds.; Cambridge University Press: Cambridge, U.K., 1996]. Although the anthropogenic $CO_2$ emissions are small compared to the amount of $CO_2$ exchanged in the natural cycles, the discrepancy between the long life of $CO_2$ in the atmosphere (50–200 years) and the slow rate of natural $CO_2$ sequestration processes leads to $CO_2$ build up in the atmosphere. The IPCC (Intergovernmental Panel on Climate Change) opines that "the balance of evidence suggests a discernible human influence on the global climate." Therefore, it is necessary to develop cost effective $CO_2$ management schemes to curb its emission.

Many of the envisaged $CO_2$ management schemes consist of three parts—separation, transportation and sequestration of $CO_2$ [FETC Carbon Sequestration R&D Program Plan: FY 1999–2000. National Energy Technology Laboratory, Department of Energy, Washington, D.C., 1999]. The cost of separation and compression of $CO_2$ to 110 bar (for transportation of $CO_2$ in liquid state) is estimated at $30–50 per ton $CO_2$, and transportation and sequestration would cost about $1–3 per ton per 100 km and $1–3 per ton of $CO_2$, respectively [Wallace, D. Capture and Storage of $CO_2$. What Needs To Be Done. Presented at the 6th Conference of the Parties, COP 6, to the United Nations Framework Convention on Climate Change; The Hague, The Netherlands, Nov. 13–24, 2000; www.iea.org/envissu/index.htm]. The capture of $CO_2$ imposes severe energy penalties thereby reducing the net electricity output by as much as 13–37% [Herzog, H.; Drake, E.; Adams, E. $CO_2$ Capture, Reuse, and Storage Technologies for Mitigating Global Climate Change. A White Paper; Final Report No. DE-AF22-96PC01257, January 1997]. The dominating costs associated with the current $CO_2$ separation technologies necessitate development of economical alternatives.

Historically, $CO_2$ separation was motivated by enhanced oil recovery [Kaplan, L. J. Cost-Saving Processes Recovers $CO_2$ from Power-Plant Flue gas. Chem. Eng. 1982, 89 (24), 30–31; Pauley, C. P.; Smiskey, P. L.; Haigh, S. N-ReN Recovers $CO_2$ from Flue Gas Economically. Oil Gas J. 1984, 82(20), 87–92]. Currently, industrial processes such as limestone calcination, synthesis of ammonia and hydrogen production require $CO_2$ separation. Absorption processes employ physical and chemical solvents such as Selexol and Rectisol, MEA and KS-2 [Reimer, P.; Audus, H.; Smith, A. Carbon Dioxide Capture from Power Stations. IEA Greenhouse R&D Programme, www.ieagreen.org.uk, 2001. ISBN 1 898373 15 9; Blauwhoff, P. M. M.; Versteeg, G. F.; van Swaaij, W. P. M. A study on the reaction between $CO_2$ and alkanoamines in aqueous solution. Chem. Eng. Sci. 1984, 39(2), 207–225. Mimura, T.; Simayoshi, H.; Suda, T.; Iijima, M.; Mitsuake, S. Development of Energy Saving Technology for Flue Gas Carbon Dioxide Recovery by Chemical Absorption Method and Steam System in Power Plant. Energy Convers. Mgmt. 1997, 38, Suppl. P.S57–S62]. Adsorption systems capture $CO_2$ on a bed of adsorbent materials such as molecular sieves and activated carbon [Kikkinides, E. S.; Yang, R. T.; Cho, S. H. Concentration and Recovery of $CO_2$ from flue gas by pressure swing adsorption. Ind. Eng. Chem. Res. 1993, 32, 2714–2720]. $CO_2$ can also be separated from the other gases by condensing it out at cryogenic temperatures. Polymers, metals such as palladium, and molecular sieves are being evaluated for membrane based separation processes [Reimer, P.; Audus, H.; Smith, A. Carbon Dioxide Capture from Power Stations. IEA Greenhouse R&D Programme, www.ieagreen.org.uk, 2001. ISBN 1 898373 15 9].

Reaction based processes, as promulgated in this work, can be applied to separate $CO_2$ from gas mixtures. This process is based on a heterogeneous gas-solid non-catalytic carbonation reaction where gaseous $CO_2$ reacts with solid metal oxide (represented by MO) to yield the metal carbonate ($MCO_3$). The reaction can be represented by:

$$MO + CO_2 \rightarrow MCO_3 \tag{1}$$

Once the metal oxide has reached its ultimate conversion, it can be thermally regenerated to the metal oxide and $CO_2$ by the calcination of the metal carbonate product. The calcination reaction can be represented by:

$$MCO_3 \rightarrow MO + CO_2 \tag{2}$$

As an example of the above-mentioned scheme, FIG. 1 shows the variation in the free energy of the carbonation reaction as a function of temperature for calcium oxide. From the figure, we can see that the carbonation reaction is thermodynamically favored with a decrease in temperature (Gibbs free energy declines with a decrease in temperature). However, at lower temperatures, the carbonation-reaction is kinetically slow. In fact, it takes geological time scales for the formation of $CaCO_3$ by the reaction between CaO and atmospheric $CO_2$ (at 280–360 ppm) at ambient temperatures. It should also be noted that the carbonation reaction would be favored as long as the free energy is negative. This creates an upper bound of 890° C. for carbonation to occur under a $CO_2$ partial pressure of 1 atm. The equilibrium temperature for this reaction is a function of the partial pressure of $CO_2$. A reaction based $CO_2$ separation process offers many advantages. Under ideal conditions, MEA captures 60 g $CO_2$/kg, silica gel adsorbs 13.2 g $CO_2$/kg and activated carbon adsorbs 88 g $CO_2$/kg. The sorption capacity of some metal oxides (such as the modified CaO, presented in this study) is about 700 g $CO_2$/kg of CaO. This is about an order of magnitude higher than the capacity of adsorbents/solvents used in other $CO_2$ separation processes and would significantly reduce the size of the reactors and the material handling associated with $CO_2$ separation.

Numerous metal oxides exhibit the carbonation and calcination reaction. The calcination temperature of a few metal carbonates ($CaCO_3$ ~750° C., $MgCO_3$ ~385° C., $ZnCO_3$ ~340° C., $PbCO_3$ ~350° C., $CuCO_3$ ~225–290° C. and $MnCO_3$ ~440° C.) makes them viable candidates for this process. Apart from CaO, gas-solid carbonation of other metal oxides has not been widely studied. The carbonation of ZnO to $ZnCO_3$ at 8–13° C. was low when exposed to $CO_2$ and $H_2O$ for over 100 days (Sawada, Y.; Murakami, M.; Nishide, T. Thermal analysis of basic zinc carbonate. Part 1. Carbonation process of zinc oxide powders at 8 and 13° C. *Thermochim. Acta.* 1996, 273, 95–102.). $MnCO_3$ undergoes a more complex thermal degradation phenomena. $MnCO_3$ first decomposes to $MnO_2$ at 300° C., which in turn changes to $Mn_2O_3$ at 440° C. At higher temperatures (~900° C.), the final thermal decomposition product was identified as $Mn_3O_4$ (Shaheen, W. M.; Selim, M. M. Effect of thermal treatment on physicochemical properties of pure and mixed manganese carbonate and basic copper carbonate. *Thermochim. Acta.* 1998, 322(2), 117–128.). Different oxides of manganese provide the flexibility of exploiting the carbonation/calcination reaction over a wider temperature range. Aqueous phase MgO carbonation has been studied for its suitability for mineral-based $CO_2$ sequestration (Fernandez, A. I.; Chimenos, J. M.; Segarra, M.; Fernandez, M. A.; Espiell, F. Kinetic study of carbonation of MgO slurries. *Hydrometallurgy.* 1999, 53,155–167). The carbonation extent of $Mg(OH)_2$ was about 10% between 387–400° C. and 6% formation between 475–500° C. (Butt, D. P.; Lackner, K. S.; Wendt, C. H.; Conzone, S. D.; Kung, H.; Lu, Y-C.; Bremser, J. K. Kinetics of Thermal Dehydroxylation and Carbonation of Magnesium Hydroxide. *J. Am. Ceram. Soc.* 1996, 79(7), 1892–1898). They attributed the low conversions to the formation of a non-porous carbonate product layer. This layer hinders the inward diffusion of $CO_2$ and the outward diffusion of $H_2O$ (a product of the carbonation reaction) leading to low conversions. The carbonation of PbO was studied as a part of the chemical heat pump process (Kato, Y.; Saku, D.; Harada, N.; Yoshizawa, Y. Utilization of High Temperature Heat from Nuclear Reactor using Inorganic Chemical Heat Pump. *Progress in Nuclear Energy.* 1998, 32(3–4), 563–570. & Kato, Y.; Harada, N.; Yoshizawa, Y. Kinetic feasibility of a chemical heat pump for heat utilization from high temperature processes. *Applied Thermal Engineering.* 1999, 19, 239–254). They reported 30% conversion in an hour under 100% $CO_2$ atmosphere at 300° C. Furthermore, they found the reactivity of PbO to drop with the number of carbonation-calcination cycles.

Carbonation of calcium oxide has been widely studied. Related applications of the CaO carbonation and calcination include the storage of energy (Barker, R. The Reversibility of the Reaction $CaCO_3 = CaO + CO_2$. *J. Appl. Chem. Biotechnol.* 1973, 23, 733–742) and the zero emission coal alliance process, consisting of hydrogasification of coal fueled by the heat of the carbonation reaction (Tinkler, M. J.; Cheh, C. Towards a Coal-capable Solid Oxide Fuel Cell System. *Proceedings of the 26th International Technical Conference on Coal Utilization and Fuel Systems;* Clearwater, Fla., Mar. 5–8, 2001; pp 569–570). The gas-solid CaO—$CO_2$ reaction proceeds through two rate-controlling regimes. The first regime involves a rapid, heterogeneous chemical reaction. In the second regime, the reaction slows down due to the formation of an impervious layer of $CaCO_3$. This product layer prevents the exposure of unreacted CaO in the particle core to $CO_2$ for further carbonation. The kinetics of the second regime is governed by the diffusion of ions through the $CaCO_3$ product layer. The activation energy was estimated to be 21 kcal/mol below 688 K and 43 kcal/mol above it for the product layer diffusion, based on the counter migration of $CO_3^{2-}$ and $O^{2-}$ ions through the product layer (Bhatia, S. K.; and Perlmutter, D. D. Effect of the product layer on the kinetics of the $CO_2$-Lime Reaction. *AIChE J.* 1983, 29(1), 79–86).

The extent of the carbonation reaction reported in many studies has also shown considerable variation. Stoichiometrically, 56 g of CaO should react with 44 g of $CO_2$ to form 100 g of $CaCO_3$. This translates to about 78.6-wt % capacity for CaO. However, the structural limitations prevent the attainment of theoretical conversion. The extent of carbonation was only 23-wt % in 30 minutes at 600° C. (Dedman, A. J.; Owen, A. J. Calcium Cyanamide Synthesis, Part 4.—The reaction $CaO + CO_2 = CaCO_3$. *Trans. Faraday Soc.* 1962, 58, 2027–2035). A higher surface area CaO sorbent provided 55-wt % $CO_2$ sorption (Bhatia, S. K.; and Perlmutter, D. D. Effect of the product layer on the kinetics of the $CO_2$-Lime Reaction. *AIChE J.* 1983, 29(1), 79–86). 64-wt % $CO_2$ sorption was achieved at 1050° C. temperature and 11.74 atm $CO_2$ pressure in 32 hours (Mess, D.; Sarofim, A. F.; Longwell, J.P. Product Layer Diffusion during the Reaction of Calcium Oxide with Carbon Dioxide. *Energy and Fuels.* 1999, 13, 999–1005). However, the extent of carbonation at lower temperature/pressure conditions that are more characteristic of $CO_2$ containing gaseous mixtures is absent in their work. The limitation in total conversion stems essentially from the nature of the initial pore size distribution of the CaO sorbent. Microporous sorbents (pore size <2 nm) are very susceptible to pore blockage and plugging due to the formation of higher molar volume product (molar volume of CaO: 17 cm$^3$/mol; molar volume of $CaCO_3$: 37 cm$^3$/mol). CaO sorbents obtained from naturally occurring precursors are usually microporous in nature. At the end of the kinetically controlled regime, diffusion processes through the product layer control the reaction rate. Similar structural limitations have prevented calcium-based sorbents from attaining theoretical conversion for the sulfation reaction between CaO and sulfur dioxide ($SO_2$) as well (Wei, S.-H.; Mahuli, S. K.; Agnihotri, R.; Fan, L.-S. High Surface Area Calcium Carbonate: Pore Structural Properties and Sulfation Characteristics. *Ind. Eng. Chem. Res.* 1997, 36(6), 2141–2148). They suggested that a mesoporous structure, which maximizes porosity in the 5–20 nm pore size range, would be less susceptible to pore pluggage. This structure would also be able to provide sufficient surface area to ensure rapid kinetics. Their modified precipitation technique resulted in a mesoporous $CaCO_3$ structure that also had a high BET surface area determined by nitrogen (60 m$^2$/g). A similar approach could also enhance the reactivity of CaO sorbents towards the carbonation reaction, which is the focus of this study.

Lastly, it is important that the CaO sorbents maintain their reactivity over many carbonation and calcination cycles. The conversion of CaO dropped from about 73% in the first carbonation cycle to 43% at the end of the 5$^{th}$ cycle at 866° C. (Barker, R. The Reversibility of the Reaction $CaCO_3 = CaO + CO_2$. *J. Appl. Chem. Biotechnol.* 1973, 23, 733–742 & Barker, R. The Reactivity of Calcium Oxide Towards Carbon Dioxide and its use for Energy Storage. *J. Appl. Chem. Biotechnol.* 1974, 24, 221–227). Barker suggested that the $CaCO_3$ layer is about 22 nm thick and his latter work showed repeated 93% conversion over 30 cycles at 629° C. on 10 nm CaO particles. In another study, cyclical studies conducted at a carbonation temperature of 880° C. and calcination at 860° C. led to a drop in conversion from 70% in the first carbonation to 38% in the $7^{th}$ carbonation step (Kato, Y.; Harada, N.; Yoshizawa, Y. Kinetic feasibility of a chemical heat pump for heat utilization from high temperature processes. *Applied Thermal Engineering.* 1999, 19, 239–254). The process described here leads to >95% conversion due to the application of novel mesoporous CaO sorbents for $CO_2$ capture and maintains their reactivity over repeated cycles of carbonation and calcination.

SUMMARY OF THE INVENTION

The present invention includes a calcium oxide, its usage for the separation of $CO_2$ from multicomponent gas mixtures and the optimum process conditions necessary for enhancing the repeatability of the process.

A preferred method for separating carbon dioxide from a flow of gas comprising carbon dioxide comprises the steps of: (1) directing the flow of gas to a gas-solid contact reactor, the gas-solid contact reactor contains at least one sorbent comprising at least one metal oxide; (2) reacting the carbon dioxide with the at least one sorbent so as to remove the carbon dioxide from said flow of gas, thereby converting the at least one sorbent into spent sorbent; (3) calcining the spent sorbent so as to liberate the carbon dioxide from the spent sorbent, thereby regenerating the sorbent; and (4) repeating the aforementioned steps.

Although any metal oxide may be employed, it is preferred that the at least one metal oxide is selected from the group consisting of: ZnO, MgO, $MnO_2$, NiO, CuO, PbO, and CaO. Further, it is preferred that the spent sorbent is a metal carbonate.

It is preferred that the sorbent has a sorption capacity of at least about 70 grams of carbon dioxide per kilogram of sorbent. However, it is even more preferred that the sorbent has a sorption capacity of at least about 300 grams of carbon dioxide per kilogram of sorbent. Irrespective of the sorption capacity of the sorbent, it is preferred that the sorbent has substantially the same sorption capacity after calcining as the sorbent had prior to adsorbing the carbon dioxide.

Although any calcination method may be employed, it is preferred that the calcining is performed under at least partial vacuum. It is also preferred that the calcining is performed by steam.

The present invention includes facilities practicing the aforementioned method.

A method for separating carbon dioxide from a flow of gas comprising carbon dioxide of the present invention comprises the steps of: (1) directing the flow of gas to a first gas-solid contact reactor, the first gas-solid contact reactor containing at least one sorbent, the sorbent comprising at least one metal oxide; (2) reacting the carbon dioxide in the flow of gas on the sorbent in the first gas-solid contact reactor so as to remove the carbon dioxide from the flow of gas; (3) directing the flow of gas to a second gas-solid contact reactor when the sorbent in the first gas-solid contact reactor is spent thereby forming spent sorbent, the second gas-solid contact reactor containing at least one sorbent, the sorbent comprising at least one metal oxide; (4) reacting the carbon dioxide in the flow of gas on the sorbent in the second gas-solid contact reactor so as to remove the carbon dioxide from the flow of gas; (5) calcining the spent sorbent from the first gas-solid contact reactor so as to generate carbon dioxide and to regenerate the sorbent; (6) directing the flow of gas to the first gas-solid contact reactor when the sorbent in the second gas-solid contact reactor is spent, thereby forming spent sorbent; and (7) calcining the spent sorbent from the second gas-solid contact reactor so as to generate carbon dioxide and to regenerate the sorbent.

Although any calcination method may be employed, it is preferred that the calcining is performed under at least partial vacuum. It is also preferred that the calcining is performed by steam. This applies to both gas-solid contact reactors.

Although any metal oxide may be utilized, it is preferred that the at least one metal oxide is selected from the group consisting of: ZnO, MgO, $MnO_2$, NiO, CuO, PbO, and CaO.

It is preferred that the sorbent has a sorption capacity of at least about 70 grams of carbon dioxide per kilogram of sorbent. However, it is even more preferred that the sorbent has a sorption capacity of at least about 300 grams of carbon dioxide per kilogram of sorbent. Irrespective of the sorption capacity of the sorbent, it is preferred that the sorbent has substantially the same sorption capacity after calcining as the sorbent had prior to adsorbing the carbon dioxide.

The present invention also includes facilities practicing the aforementioned method A method for regenerating a spent sorbent for carbon dioxide of the present invention comprises the steps of: (1) providing a spent sorbent, the spent sorbent comprising metal carbonate; and (2) calcining the spent sorbent so as to liberate carbon dioxide gas and so as to regenerate the spent sorbent thereby forming a sorbent comprising a metal oxide.

It is preferred that the spent sorbent is calcium carbonate. It is further preferred that the metal oxide is calcium oxide.

It is preferred that the sorbent has substantially the same sorption capacity after calcining as the sorbent had prior to adsorbing the carbon dioxide.

Although any calcination method may be employed, it is preferred that the calcining is performed under at least partial vacuum. It is also preferred that the calcining is performed by steam. This applies to both gas-solid contact reactors.

The present invention includes facilities practicing the aforementioned method.

A method for producing a sorbent of the present invention comprises the steps of: (1) obtaining a structurally altered high surface area calcium carbonate having a surface area of at least 25.0 $m^2/g$, a pore volume of at least 0.05 $cm^3/g$, and a mesoporous pore size distribution; and (2) calcining the structurally altered high surface area calcium carbonate so as to produce a sorbent having a surface area of less than 22 $m^2/g$, a pore volume of at least 0.005 $cm^3/g$, and a mesoporous pore size distribution.

Although any calcination method may be employed, it is preferred that the calcining is performed under at least partial vacuum. It is also preferred that the calcining is performed by steam. This applies to both gas-solid contact reactors.

The present invention includes sorbents made according to the aforementioned method.

A sorbent according to the present invention comprising calcium oxide having a surface area of at least 12.0 $m^2/g$ and a pore volume of at least 0.015 $cm^3/g$, the calcium carbonate sorbent having sorption capacity of at least about 70 grams of carbon dioxide per kilogram of sorbent.

In addition to the novel features and advantages mentioned above, other objects and advantages of the present invention will be readily apparent from the following descriptions of the drawing(s) and preferred embodiment(s).

DETAILED DESCRIPTION OF THE PREFERRED EMBODIMENT(S)

In accordance with the foregoing summary, the following presents a detailed description of the preferred embodiment(s) of the invention that are currently considered to be the best mode.

Chemicals, Sorbents and Gases

Naturally occurring limestone ($CaCO_3$) and hydrated lime ($Ca(OH)_2$), synthesized from it were obtained from Linwood Mining and Minerals. Dolomite ($CaCO_3 \cdot MgCO_3$) was procured from the National Dolomite Company. The purity of these ores was above 90%. High purity metal oxides such as ZnO, MgO, $MnO_2$, NiO, CuO, PbO, CaO were obtained from Aldrich Chemical Company. Precipitated calcium carbonate (PCC) was synthesized from Linwood hydrate by the procedure described in a following section. N40V dispersant, a sodium salt of a carboxylic acid, used in the synthesis of PCC was obtained from Allied Colloid. The synthesis procedure is described in detail in a following section. $N_2$ and $CO_2$ used for calcination and carbonation experiments were 99.999% and 99.9% pure, respectively.

Sorbent Reactivity Testing and Structural Analysis

The reactivity testing of CaO sorbents for carbonation was carried out in a Perkin Elmer Thermogravimetric Analyzer (TGA-7) apparatus. The balance can accurately measure up to 1 microgram. A small sample of the sorbent (5–20 mg) is placed in a quartz boat. The weight of the sample was recorded every second. The structural properties of CaO sorbents and their precursors were tested in a NOVA 2200 analyzer (Quantachrome Company). The BET surface area, pore volume, and pore size distribution were measured at −196° C. using nitrogen as the adsorbent.

Screening of Metal Oxides

Figure 1:
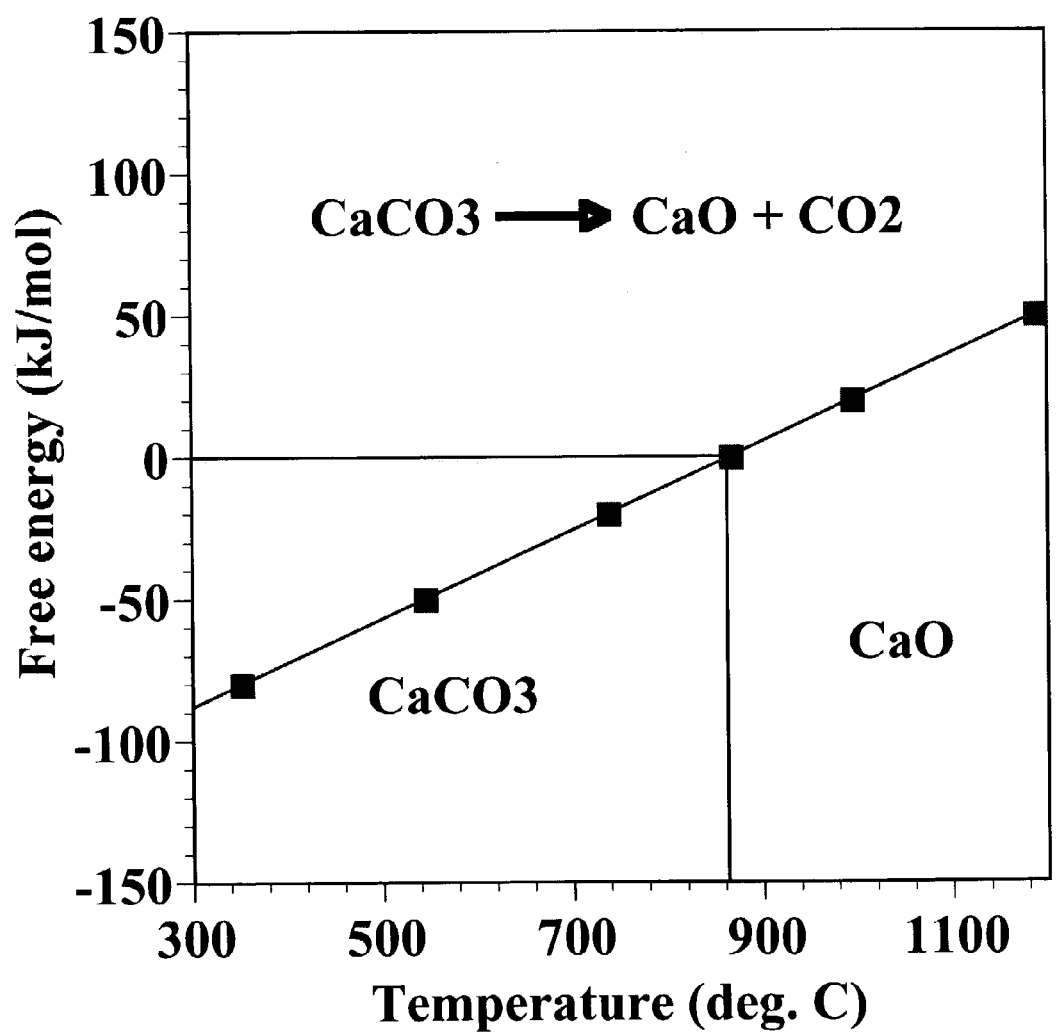
FIG. 1 depicts the Gibbs Free Energy diagram for the carbonation reaction as a function of temperature.
Figure 2:
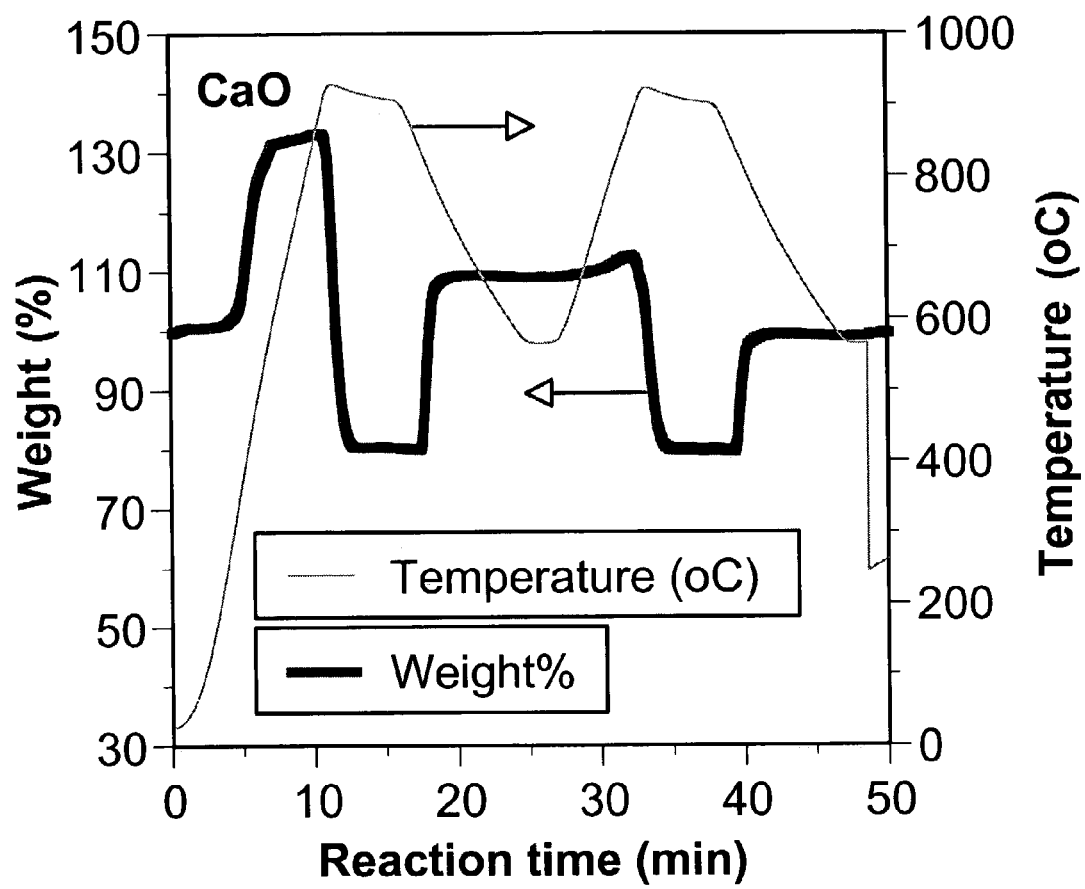
FIG. 2 illustrates the performance of calcium oxide for the carbonation reaction.

Metal oxides such as ZnO, MgO, CuO, $MnO_2$, NiO, PbO and CaO that undergo the CCR scheme in the 800–200° C. temperature range were analyzed for their reactivity in a TGA. A powdered sample of these oxides was placed in a quartz pan and pure $CO_2$ was passed over the sample metal oxide. The temperature was then slowly raised and the weight of the sample was continuously monitored. An increase in the weight of the sample is an indication of the formation of metal carbonate. FIG. 2 provides experimental data for the carbonation of lime ($Ca(OH)_2$) under flowing pure $CO_2$ gas. With an increase in temperature, the weight of the sample increases till the temperature reaches about 890° C. Calcination, which is thermodynamically favored above 890° C. at 1 atm $CO_2$ partial pressure, causes a rapid decrease in weight until the sorbent converts completely to CaO. When the sample is reheated, the weight starts to increase again and the process is repeated once more. Besides proving that CaO is a viable candidate, the data also shows recyclability of the sorbent.

XRD Analysis of CaO Obtained from its Precursors

Figure 3:
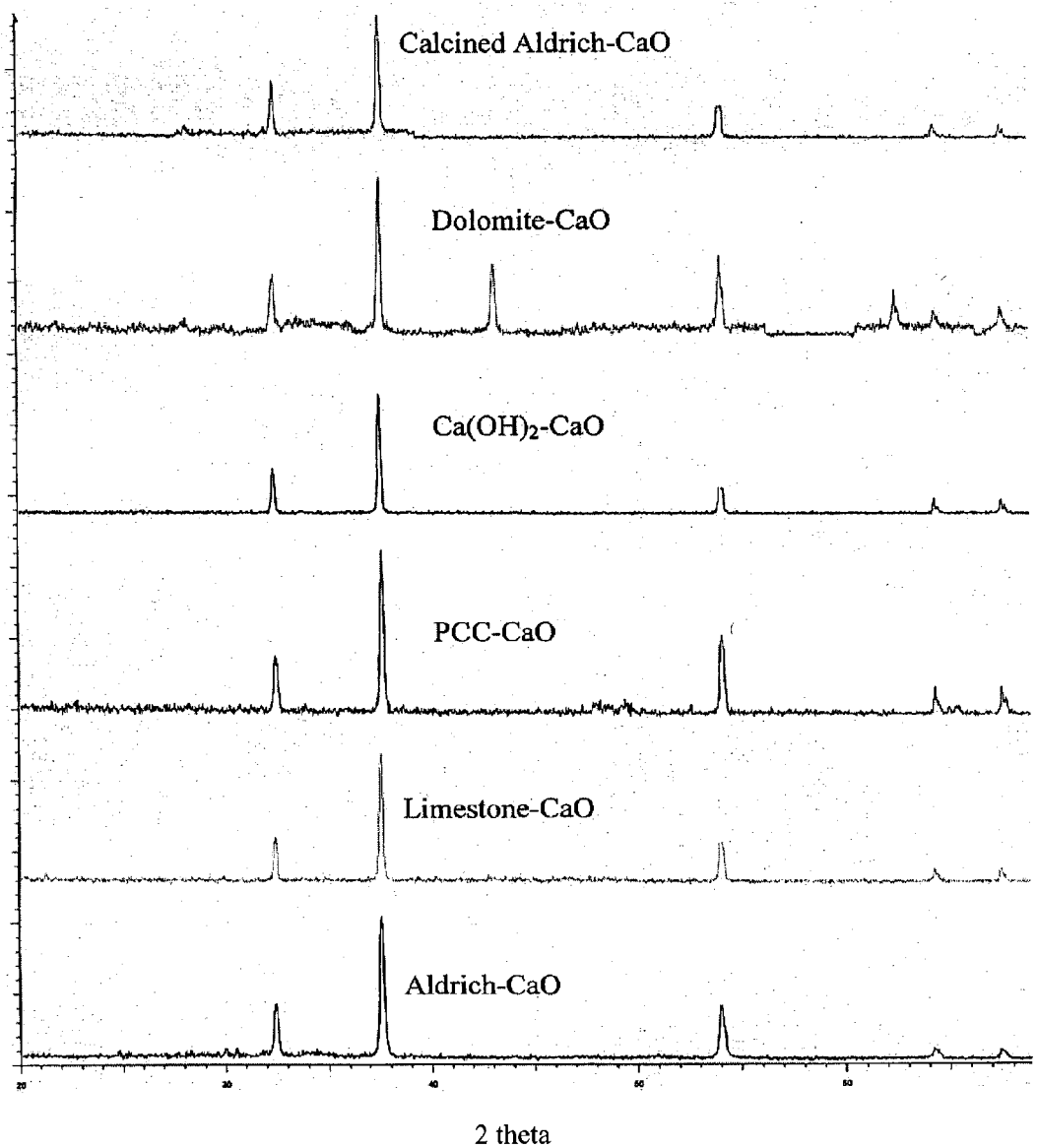
FIG. 3 compares the XRD diffractograms of CaO derived from various precursors.

CaO was identified as a viable candidate for the carbonation-calcination reactions. However, a variety of precursors can be calcined to obtain the CaO sorbents necessary for the carbonation reaction. Common and economical precursors include calcium carbonate, calcium hydroxide and dolomite. The other important source of CaO is via the calcination of synthesized high surface area precipitated calcium carbonate. In order to compare the crystal structure of the CaO sorbents obtained from these sources, XRD patterns were obtained on all the CaO sorbents. FIG. 3 depicts these diffractograms. From this figure we can conclude that the crystal structure of the CaO sorbents obtained from numerous sources is identical. Only the XRD pattern corresponding to dolomite-derived CaO shows extra peaks due to the presence of MgO in the calcined dolomite. Based on the similarity in all the CaO structures, it can be assumed that any difference in reactivity of CaO for carbonation is an artifact of the sorbent morphology and not due to the chemistry of the gas-solid reaction that occurs on the CaO surface.

Precipitated Calcium Carbonate (PCC) Synthesis

Figure 4:
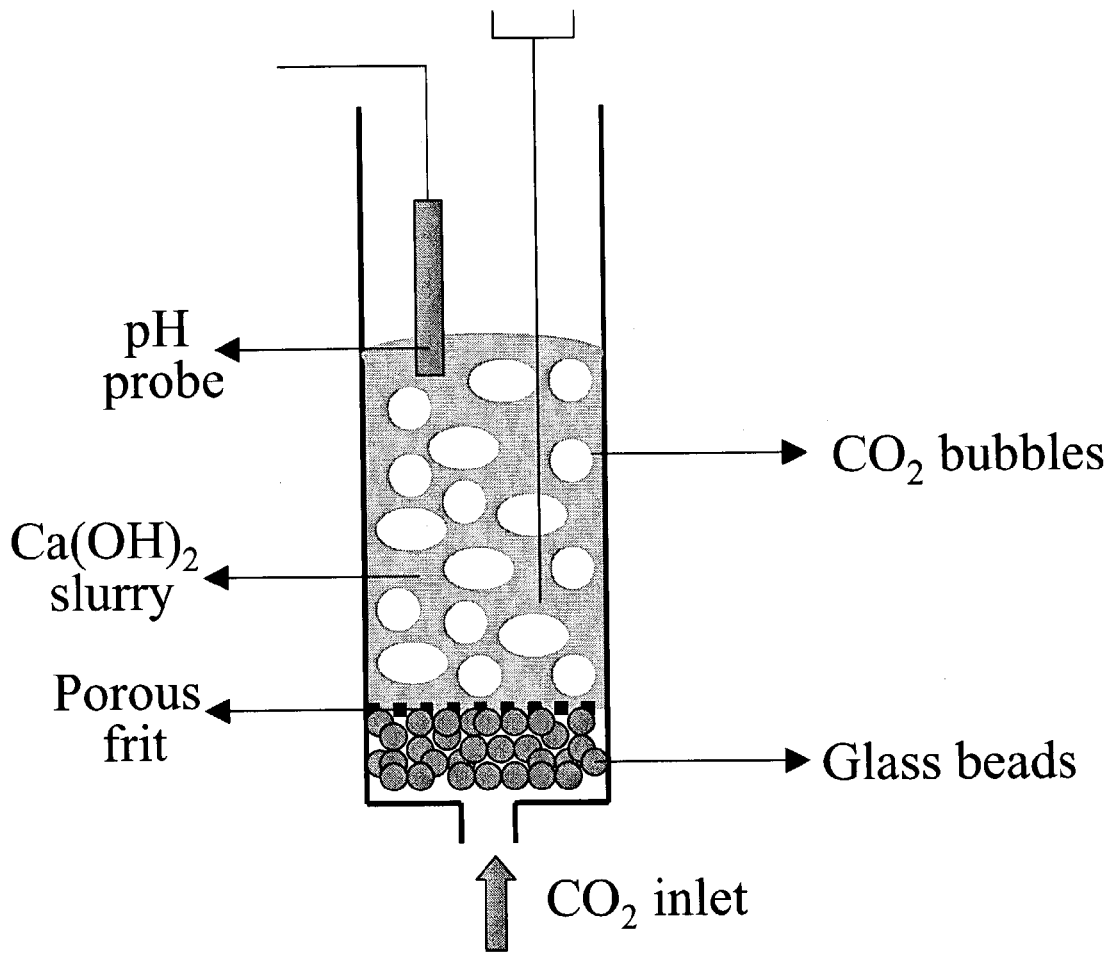
FIG. 4 is a schematic diagram of a carbonator reactor for the synthesis of precipitated calcium carbonate.
Figure 5:
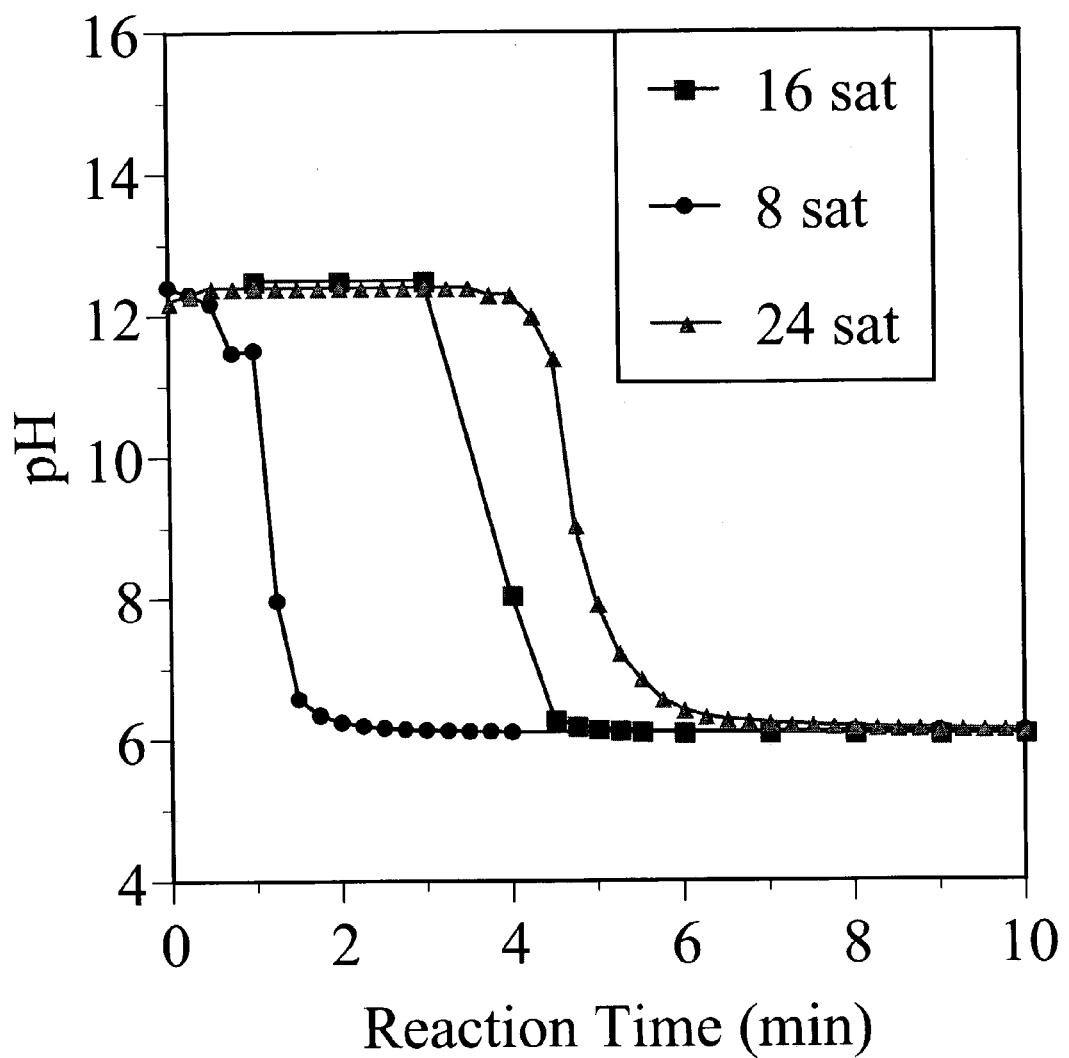
FIG. 5 shows the change in the pH of the slurry as, a function of $Ca(OH)_2$ loading. (500 mL water, 0.0575% N40V dispersant, 4 scfh $CO_2$).

Structurally altered high surface area CaO precursors were synthesized based on the procedure outlined elsewhere (Fan, L.-S.; Ghosh-Dastidar, A.; Mahuli, S.; Calcium Carbonate Sorbent and Methods of Making the Same. U.S. Pat. No. 5,779,464 and Agnihotri, R.; Chauk, S.; Mahuli, S.; Fan, L.-S. Influence of Surface Modifiers on Structure of Precipitated Calcium Carbonate. Ind. Eng. Chem. Res. 1999, 38, 2283–2291). A schematic diagram of the slurry bubble column used for this purpose is shown in FIG. 4. The carbonator consists of a 2" OD Pyrex tube. A porous frit at the bottom provides good distribution of $CO_2$ through the slurry. A K-type thermocouple inserted in the slurry continuously records the slurry temperature. A pH probe monitors the pH of the slurry as the reaction medium changes from a basic to an acidic solution as the reaction proceeds. First, 500 ml of distilled water is poured into the carbonator, followed by the addition of 0.0575 g of N40V. 12.8 g of $Ca(OH)_2$ is added to the solution to provide a loading of 2.56% by weight. This corresponds to a concentration of 16-sat (concentration of $Ca(OH)_2$ is 16 times its saturation solubility limit). The solubility of $Ca(OH)_2$ (~0.16 g/100 g water) leads to a pH of 12 at the start of the experiment. The remaining $Ca(OH)_2$ remains suspended in the solution. The ratio of N40V and $Ca(OH)_2$ loading is chosen to create a surface charge of zero on the incipiently formed $CaCO_3$ particles. The flow of $CO_2$ into the carbonator is then started and the pH was continuously monitored. FIG. 5 shows the change in pH with reaction time as a function of $Ca(OH)_2$ loading. $CO_2$ dissolved in water provides carbonate ions that react with $Ca^{++}$ ions to form $CaCO_3$ according to the reaction below:

$$Ca^{2+}+CO_3^{2-} \rightarrow CaCO_3 \qquad (3)$$

$CaCO_3$ has a much lower solubility in water (~0.0012 g/100 g water) compared to $Ca(OH)_2$ and thus precipitates out. As the reaction proceeds, $Ca^{2+}$ ions get depleted, but are continuously replenished by the suspended $Ca(OH)_2$. Hence the pH remains 12. As the reaction proceeds, $Ca(OH)_2$ ultimately gets depleted and the concentration of $Ca^{2+}$ ions cannot be maintained at its solubility limit. On the other hand, continued dissolution of $CO_2$ gas leads to the accumulation of $H^+$ ions causing the solution to become acidic. Eventually, the pH settles at about 6.0, corresponding to equilibrium solubility of $CO_2$ in water at ambient temperature. This also signals the end of the carbonation of all $Ca(OH)_2$. The slurry is then removed from the precipitator, vacuum filtered and stored in a vacuum oven at 90–110° C. for 20 hours to completely remove the moisture. Higher $Ca(OH)_2$ loading requires more reaction time as evident from FIG. 5.

Effect of the Ratio of $Ca(OH)_2$ and Dispersant on PCC Morphology

Figure 6:
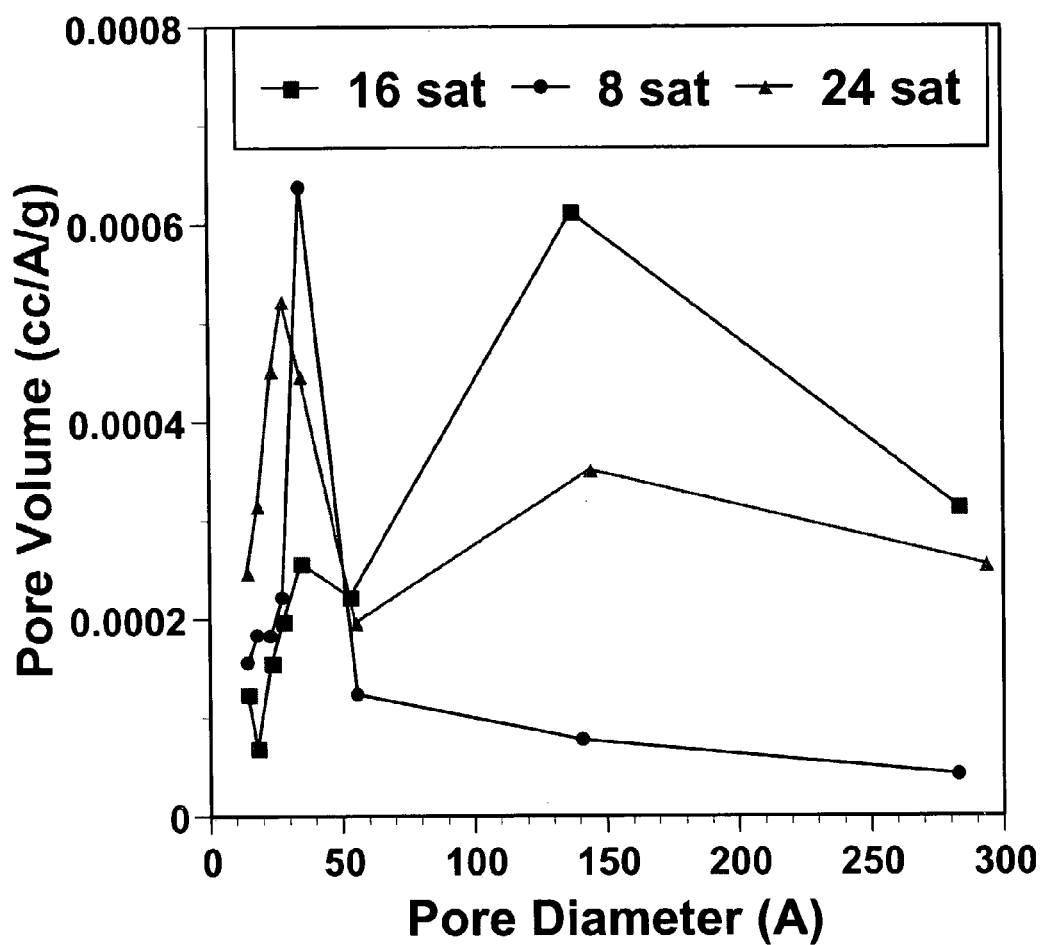
FIG. 6 depicts the effect of $Ca(OH)_2$ loading on the morphology of Precipitated Calcium Carbonate (PCC) (500 mL water, 0.0575% N40V dispersant, 4 scfh $CO_2$).

Precipitated calcium carbonate can be obtained by the reaction between carbonate and calcium ions in solution. It is known that the $CaCO_3$ nuclei that precipitate out have positive surface charge on them that prevent agglomeration (Agnihotri, R.; Chauk, S.; Mahuli, S.; Fan, L.-S. Influence of Surface Modifiers on Structure of Precipitated Calcium Carbonate. *Ind. Eng. Chem. Res.* 1999, 38, 2283–2291). The resulting structure is also microporous in nature. However, the structural properties of the synthesized PCC can be altered by the use of negatively charged dispersants that neutralize the surface charges. This makes the ratio between the $Ca(OH)_2$ loading and the dispersant used very critical. Besides, the effect of $Ca(OH)_2$ loading in the slurry was studied to enhance the productivity of the precipitation process by synthesizing more PCC from the same slurry volume. 8-sat, 1.6-sat and 24-sat were used as $Ca(OH)_2$ loading levels, all other factors remaining constant. It can be seen from FIG. 6 and Table 1 that at a concentration of 8-sat, there is proportionally more dispersant in the slurry causing the incipiently formed $CaCO_3$ particles to be negatively charged. The negative charge prevents the agglomeration of these nuclei eventually leading to the formation of microporous PCC as shown in FIG. 6. Its surface area is also relatively lower. At a $Ca(OH)_2$ loading corresponding to 16-sat, the ratio of N40V and $CaCO_3$ is balanced and the surface charge on the nuclei is zero. This allows optimal association of these nuclei leading to a predominantly mesoporous structure. The SA of PCC under these optimum conditions is also the highest at 38.3 $m^2/g$. As the loading of $Ca(OH)_2$ is raised to 24-sat, there is not enough N40V dispersant to neutralize the surface charge on all the incipiently formed nuclei. There could possibly be some positively charged particles. This again creates non-optimum conditions leading to a loss in SA and PV compared to the 16-sat case. Another experiment was conducted to process a 32-sat $Ca(OH)_2$ slurry keeping the $Ca(OH)_2$ to N40V ratio constant. The SA/PV of PCC synthesized from a 32-sat slurry was 37.07 $m^2/g$ and 0.139 $cm^3/g$ respectively; lending support to the fact that higher mass of PCC can be synthesized from the same amount of slurry.

TABLE 1

Morphological properties of PCC as a function of $N40V:Ca(OH)_2$ loading ratio (500 ml water, 0.0575% N40V dispersant, 4 scfh $CO_2$).

| $Ca(OH)_2$ loading weight % | Surface Area ($m^2/g$) | Pore Volume ($cm^3/g$) |
|---|---|---|
| 1.28 | 13.8 | 0.03 |
| 2.56 | 38.3 | 0.14 |
| 3.84 | 36.8 | 0.11 |

Pore Structure of CaO Sorbents

Figure 7:
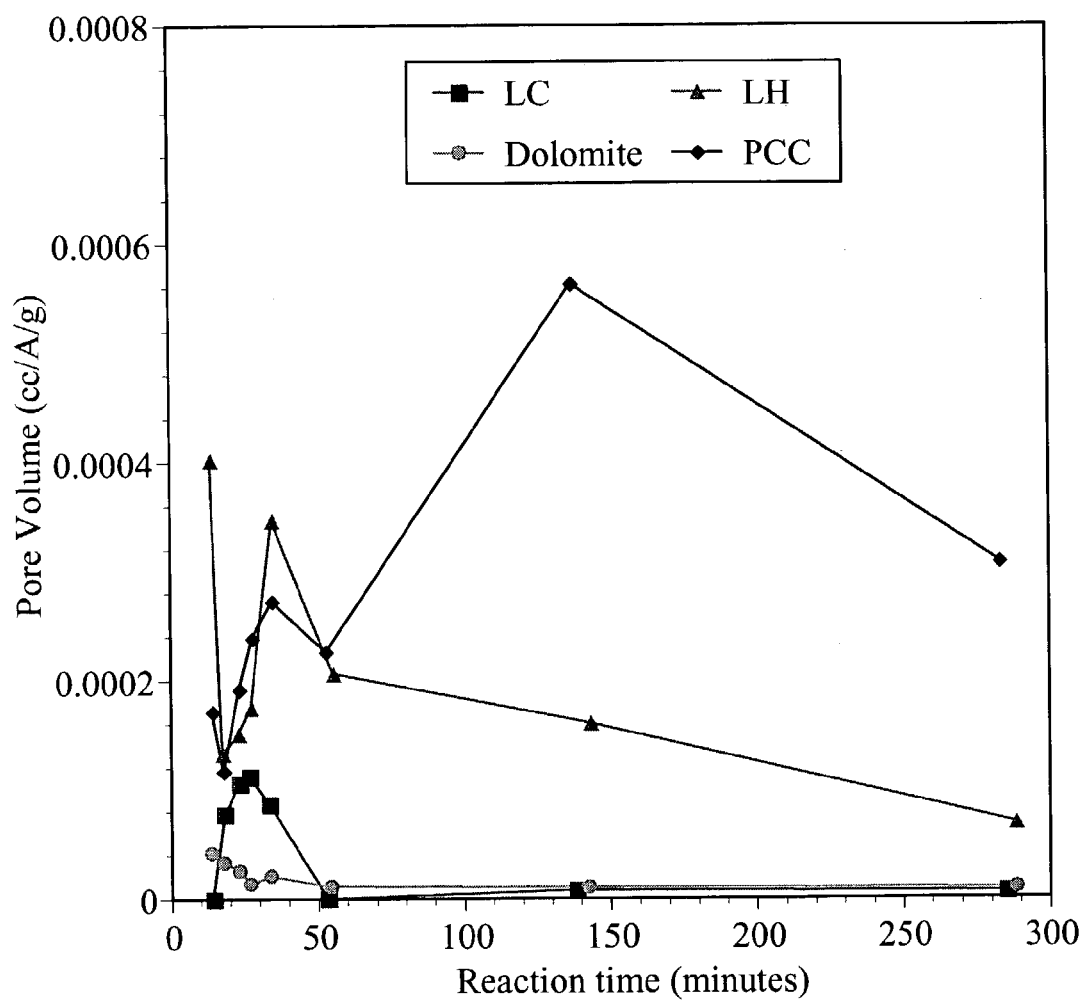
FIG. 7 compares the pore size distribution of four CaO precursors.

CaO sorbents were synthesized by calcining various CaO precursors such as Linwood calcium carbonate (LC), dolomite (DL), Linwood calcium hydroxide (LH), and precipitated calcium carbonate (PCC). For convenience, the oxides derived from these sources are termed as LC-CaO, FCD-CaO (for fully calcined dolomite-CaO), LH-CaO, and PCC-CaO, respectively. The procedure involved heating the precursor in flowing nitrogen beyond the calcination temperature (800–950° C.) for an hour followed by its storage in a desiccator. Structural properties such as surface area (SA) and pore volume (PV) of these chemicals are listed in Table 2 and their pore size distributions are shown in FIG. 7. The SA of naturally occurring minerals, LC and dolomite was very low, 1.06 and 1.82 $m^2/g$, respectively. LH was synthesized by first calcining the LC followed by its hydration. LH exhibited a considerably higher SA (13.19 $m^2/g$) and PV compared to the LC. The SA of PCC (38.3 $m^2/g$), however, was the highest among all precursors. From FIG. 5, we can infer that the structures of LC, DL and LH are predominantly microporous in nature. Most of the porosity lies in pores below 5 nm in diameter. In contrast, the maximum in PV occurs at 15 nm for PCC and most of its PV originates from mesopores in the 5–25 nm range.

TABLE 2

Morphological properties (surface area and pore volume) of various CaO sorbents and their precursors.

| Sorbent Name | Surface Area ($m^2/g$) | Pore Volume ($cm^3/g$) |
|---|---|---|
| LC | 1.1 | 0.003 |
| LC-CaO | 17.8 | 0.078 |
| Dolomite | 1.8 | 0.004 |
| FCD-CaO | 29.8 | 0.08 |
| LH | 13.2 | 0.0453 |
| LH-CaO | 33.3 | 0.1 |
| PCC | 38.3 | 0.11 |
| PCC-CaO | 12.8 | 0.027 |

Carbonation of CaO Sorbents

Figure 8:
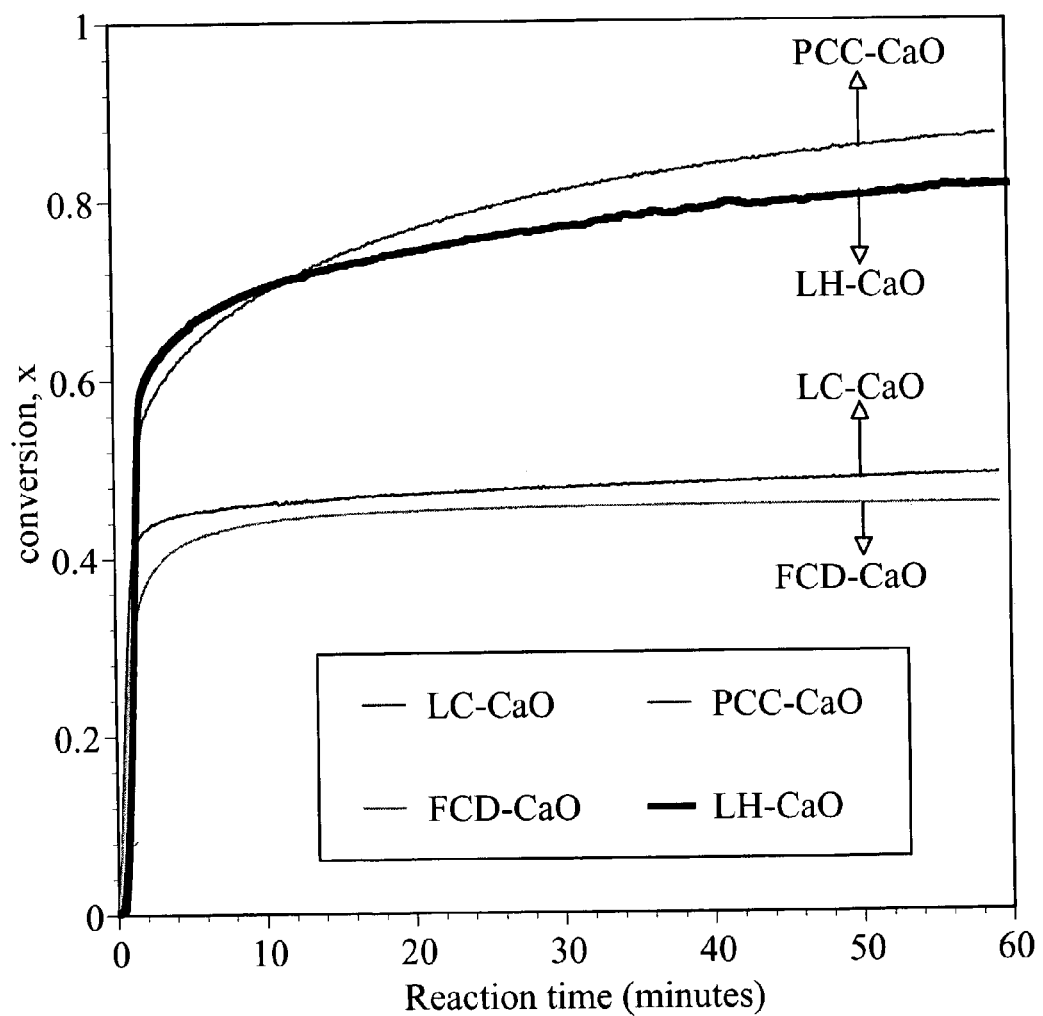
FIG. 8 compares the conversion of four CaO sorbents under pure $CO_2$ at 650° C.
Figure 9:
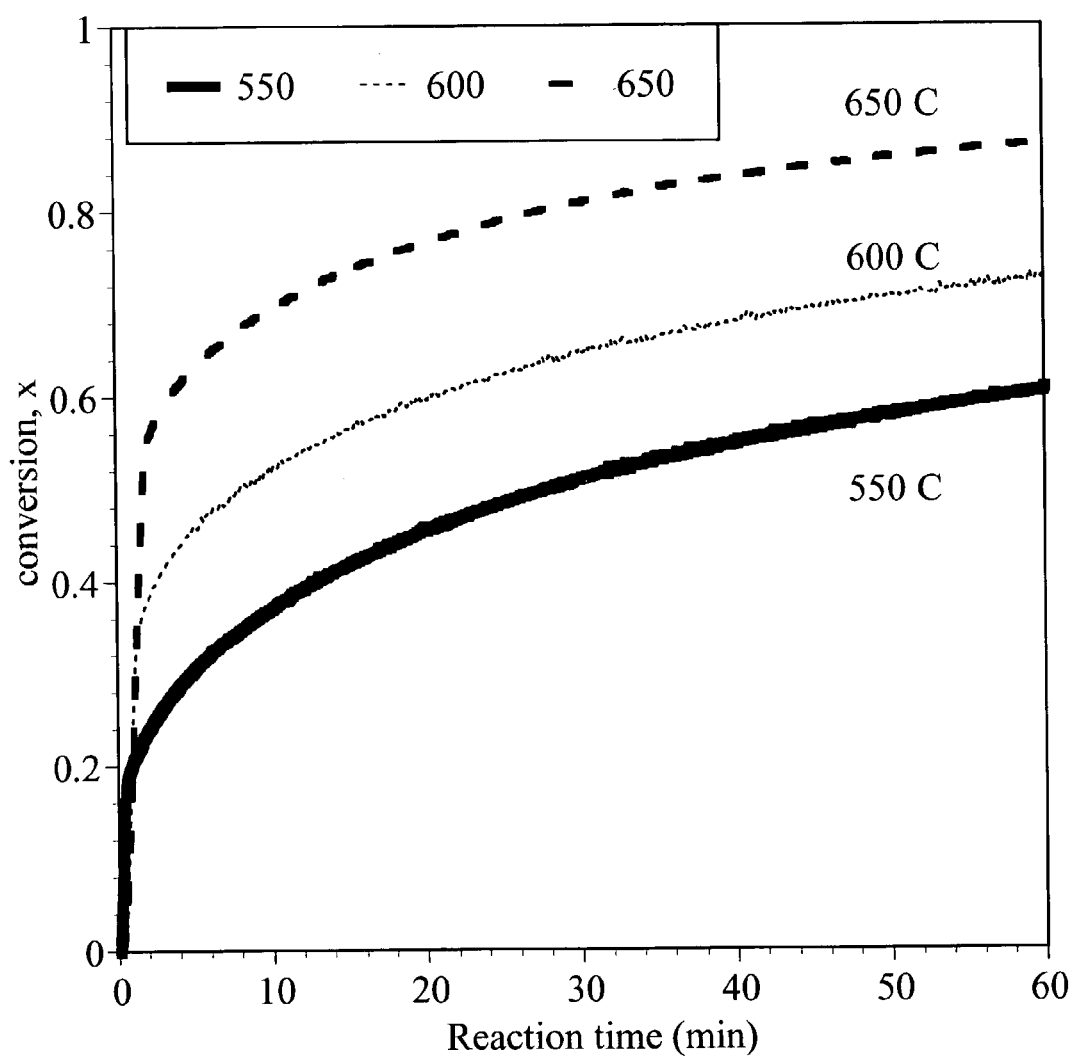
FIG. 9 illustrates the effect of temperature on the carbonation of PCC-CaO.

The performance of these four CaO sorbents was tested in a TGA. The experimental procedure consisted of placing 6–12 mg of the chosen CaO sorbent in a thin layer in a quartz pan to minimize external mass transfer resistances. The sorbent was then heated in flowing nitrogen (5.0 grade, 99.999% pure) to the desired temperature. The representative temperatures used in these experiments were 550° C., 600° C. and 650° C. Once the desired temperature was reached, the flow was switched to 100% $CO_2$ stream. The increase in weight with time was recorded and the conversion of CaO to $CaCO_3$ was calculated from the increase in weight. Only the data obtained at 650° C. is reported here. The performance of the four CaO sorbents, LC-CaO, FCD-CaO, LH-CaO and PCC-CaO at 650° C. is depicted in FIG. 8. Initially, $CO_2$ diffuses into the pores of the LC-CaO and the reaction takes place on the CaO surface provided by the pores. The figure shows that there is a rapid increase in weight in the first 1–2 minutes. The conversion attained in this kinetically controlled regime depends on the initial surface area of the CaO sorbent. LC-CaO and FCD-CaO attained 40–45% conversion, while LH-CaO and PCC-CaO attained about 60% and 54% conversion, respectively, in this regime. After this regime, conversion increases relatively slowly with time. The increase in conversion is only about 2–4% in the next hour for LC-CaO and FCD-CaO. This confirms the susceptibility of micropores to pore filling and pore pluggage described earlier due to the formation of a higher volume product, $CaCO_3$. The trend is not as dramatic for the case of LH-CaO because of its relatively higher initial surface area. The conversion for LH-CaO increases by another 18% in the diffusion controlled regime. However, the increase in conversion for PCC-CaO is about 34–36% more in the second regime. Since the PCC-CaO structure is mesoporous, the formation of $CaCO_3$ product layer is not able to plug all the pore mouths. This in turn allows the heterogeneous reaction to occur on a larger CaO surface. Once the kinetically controlled regime is over, diffusion of ions occurs through a larger area, ultimately leading to a higher conversion of 88–90% for PCC-CaO. FIG. 9 shows the effect of temperature on the carbonation of PCC-CaO. It can be seen that the extent of conversion in the kinetic regime is different at different temperatures. However, unlike LC-CaO, the conversion at any temperature does not seem to taper off and given sufficient time, PCC-CaO is capable of attaining 90% or higher conversion at all of these temperatures.

Cyclic Calcination and Carbonation

Figure 10:
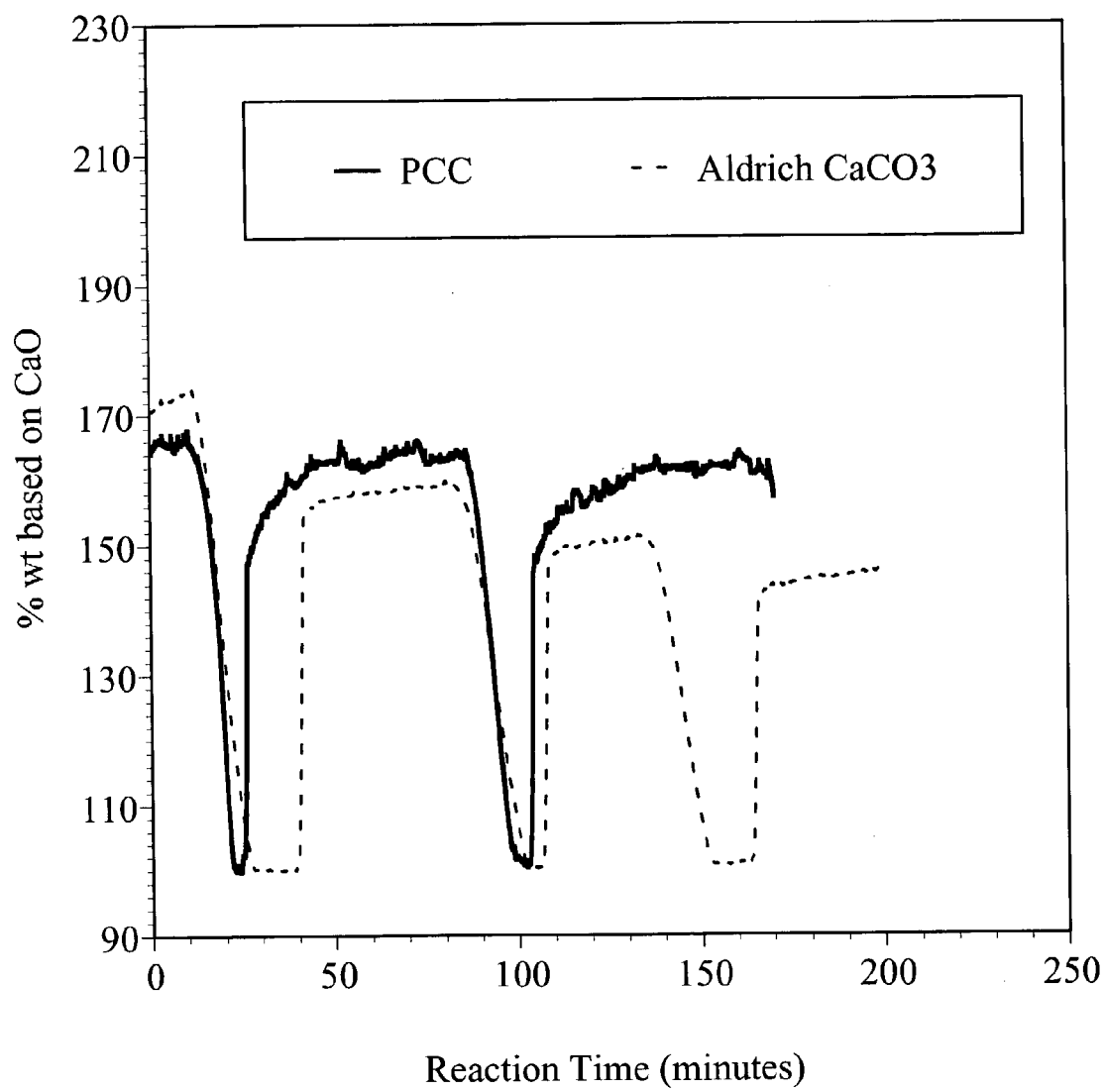
FIG. 10 illustrates the carbonation-calcination cycles on Aldrich $CaCO_3$ and PCC at 700° C.
Figure 11:
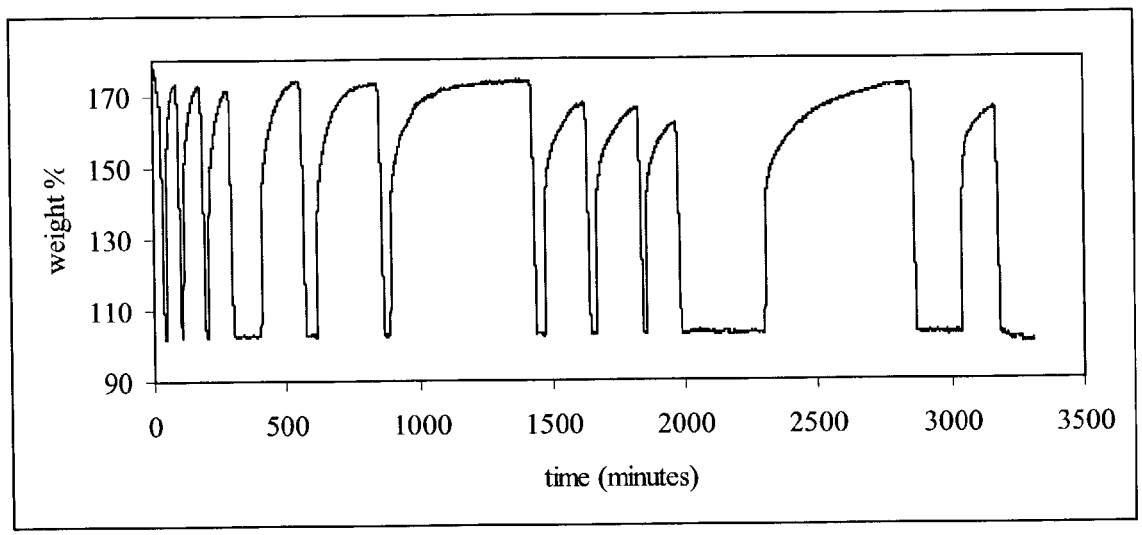
FIG. 11 shows extended carbonation-calcination cycles on precipitated calcium carbonate (PCC) powder at 700° C.

One of the possible hurdles in the utilization of metal oxides for the carbonation and calcination reaction scheme is its vulnerability to sintering due to the thermal cycling imposed by the cyclical nature of these reactions. Cyclical studies were carried out to quantify any loss in reactivity of these sorbents upon multiple cycles. The temperature chosen for cyclical studies was 700° C. This temperature is sufficient to achieve carbonation in the presence of pure $CO_2$, and also to calcine the $CaCO_3$ so formed after the gas is switched from $CO_2$ to $N_2$. A variety of precursors were first calcined in nitrogen at 700° C. The gas was then switched to pure $CO_2$ and the weight gain continuously tracked. After reaching the ultimate conversion, the gas was switched back to $N_2$. This process was repeated for 2–3 cycles. The data obtained on Aldrich $CaCO_3$ and PCC undergoing this cyclical study is shown in FIG. 10. It can be seen that the reactivity of Aldrich $CaCO_3$ exhibited a gradual decrease even after the first cycle. In contrast, PCC completely regained its mass after the first calcination and carbonation cycle. At 700° C., we can deduce that the conversion is almost complete (>95%). The figure also shows that the reactivity did not decrease in the second cycle either. Under the reaction conditions chosen, any sintering did not seem to adversely affect the sorbent morphology. We continued an extended study of eleven calcination and carbonation cycles lasting over three days on PCC. The data is provided in FIG. 11. It can be seen that the sorbent reactivity remained high and if enough reaction time is provided, the conversion could reach beyond 90% in every cycle. This is a positive result for the structural viability of this sorbent under multiple cycles.

Effect of Vacuum Calcination

Figure 12:
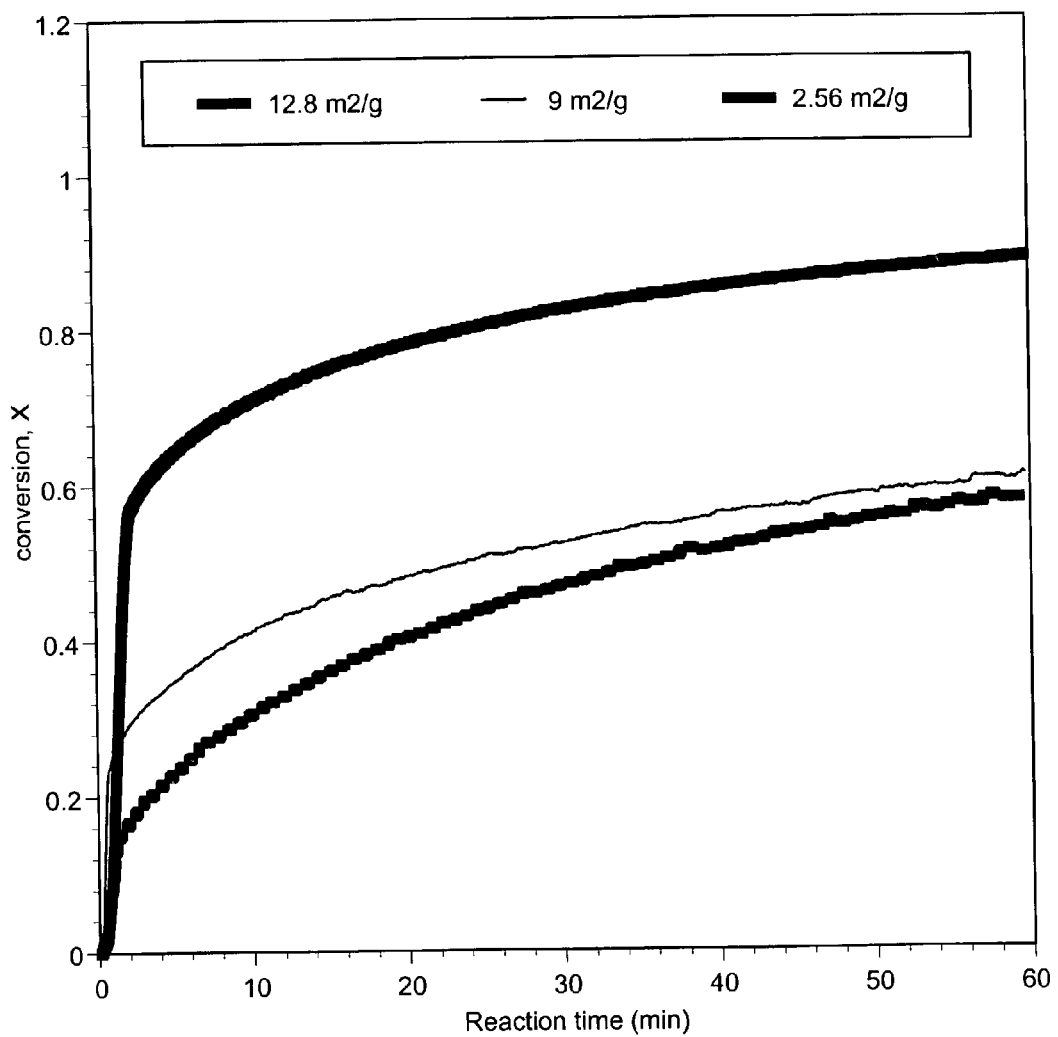
FIG. 12 compares the effect of initial surface area of PCC-CaO to its reactivity towards the carbonation reaction at 700° C.

The effect of initial surface area of CaO sorbents was studied. CaO sorbents were synthesized from PCC under different calcination conditions. The role of surface area on the extent of carbonation is shown in FIG. 12. Different surface area PCC-CaO sorbents were synthesized by the calcination of PCC at a range of calcination temperature to induce varying degrees of sintering. It can be seen that a higher initial surface area (and its associated pore volume) leads to higher reactivity and conversion. Thus, it is necessary to identify calcination conditions that optimize the SA/PV and pore size distribution of PCC-CaO. It has been suggested in literature that CaO procured from the calcination of limestone under vacuum has a higher reactivity. It was observed that under air calcination at 650–800° C., sharp edges of calcite powder were replaced by rounded surfaces and neck areas indicating severe sintering (Beruto, D., and Searcy, A. W., "Calcium oxides of high reactivity." Nature, 1976, 263, 221–222). The resulting CaO structure was highly crystalline as well. In contrast, the sharp edges of calcite were retained in the CaO obtained under vacuum. The CaO however did not possess a high degree of crystallinity. The latter also showed high reactivity towards hydration. Vacuum calcination leads to the formation of a meta-stable-nanocrystalline calcia structure while calcination in helium atmosphere lead to a stable microcrystalline calcia structure (Dash, S., Kamruddin, M., Ajikumar, P. K., Tyagi, A. K., and Raj, B., "Nanocrystalline and metastable phase formation in vacuum thermal decomposition of calcium carbonate." Thermochimica acta, 2000, 363,129–135). Beruto et al., [1980] estimated the surface area and pore volume of limestone based CaO to be about 78–89 $m^2/g$ and 0.269 ml/g respectively.

Figure 13:
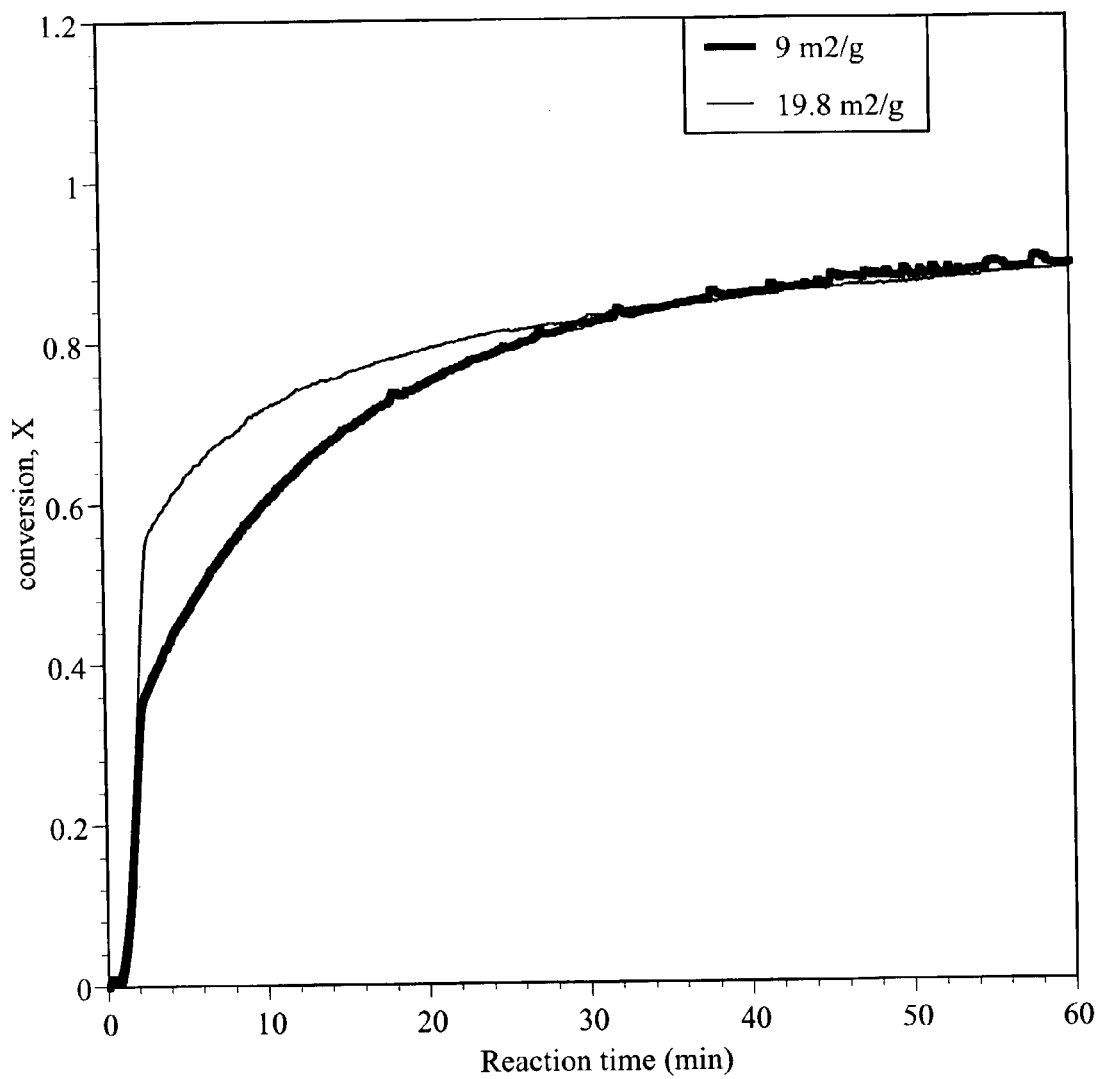
FIG. 13 depicts the effect of vacuum calcination on the reactivity of PCC-CaO towards the carbonation reaction at 700° C.

The effect of vacuum calcination was studied in this process. The surface area of Linwood carbonate increased from 17.79 to 21.93 $m^2/g$ and pore volume from 0.07815 to 0.1117 ml/g for calcination under nitrogen and under vacuum, respectively. Similar enhancements were observed for PCC based CaO sorbents as well. It has been observed that PCC-CaO is susceptible to high degree of sintering and the surface area of the sorbent falls off rapidly. Calcination in nitrogen resulted in surface areas below 13 $m^2/g$ repeatedly. However, vacuum calcination lead to a surface area of 19.84 $m^2/g$ and 0.04089 ml/g pore volume. The carbonation characteristics are shown in FIG. 13.

Vacuum calcination of PCC followed by the carbonation of PCC-CaO was repeated over two cycles. PCC was first vacuum calcined to CaO-1 at 750° C. CaO-1 was carbonated to CC-2 at 700° C. followed by its vacuum decomposition to CaO-2 that is carbonated to CC-3. The values of surface area and pore volume of the sorbent at various stages are provided in Table 3 below:

TABLE 3

Structural properties of Calcium based sorbents undergoing vacuum calcination at 750° C. and carbonation at 700° C.

|       | Surface Area (m²/g) | Pore Volume (cc/g) |
|-------|---------------------|--------------------|
| PCC   | 38.3                | 0.1416             |
| CaO-1 | 12.63               | 0.02409            |
| CC-2  | 6.5                 | 0.0103             |
| CaO-2 | 15.93               | 0.04008            |
| CC-3  | 2.361               | 0.004483           |

The data shows that PCC is susceptible to sintering because the CaO obtained in the first cycle has a surface area of only 12.63 m²/g compared to 38.3 m2/g of PCC. As expected, pore filling leads to a drop in both properties when CaO 1 carbonates. The extent of carbonation was beyond 90%. However, it can be seen that the SA of CaO obtained after the second vacuum calcination step, CaO 2, is 15.93 m²/g, which is higher than the SA of CaO 1. The pore volume of CaO 2 is also higher than that of CaO 1. These results prove that there is no systematic decline in SA and PV of sorbents with increasing calcination-carbonation cycles and that this combination is capable of providing a sustained conversion over many cycles.

The article "Carbonation-Calcination Cycle Using High Reactivity Calcium Oxide for Carbon Dioxide Separation from Flue Gas" by Himanshu Gupta and Liang-S. Fan, published on the web Jul. 11, 2002 by *Ind. Eng. Chem. Res.* 2002, 41, 4035–4042 is hereby incorporated in its entirety by reference.

While the invention has been described in connection with what is presently considered to be the most practical and preferred embodiments, it is to be understood that the invention is not to be limited to the disclosed embodiment(s), but on the contrary, is intended to cover various modifications and equivalent arrangements included within the spirit and scope of the appended claims, which are incorporated herein by reference.

What is claimed is:

1. A method for producing a sorbent, said method comprising the steps of:
    obtaining a structurally altered high surface area calcium carbonate having a surface area of at least 25.0 m²/g, a pore volume of at least 0.05 cm³/g, and a mesoporous pore size distribution; and
    calcining said structurally altered high surface area calcium carbonate so as to produce a sorbent having a surface area of less than 22 m²/g, a pore volume of at least 0.005 cm³/g, and a mesoporous pore size distribution.

2. The method according to claim 1 wherein said calcining is conducted under at least partial vacuum.

3. The method according to claim 1 wherein said calcining is conducted by steam.

* * * * *